United States Patent
Kunjithapatham et al.

(10) Patent No.: US 8,510,737 B2
(45) Date of Patent: Aug. 13, 2013

(54) METHOD AND SYSTEM FOR PRIORITIZING TASKS MADE AVAILABLE BY DEVICES IN A NETWORK

(75) Inventors: Anugeetha Kunjithapatham, Sunnyvale, CA (US); Mithun Sheshagiri, Palo Alto, CA (US); Alan Messer, Los Gatos, CA (US)

(73) Assignee: Samsung Electronics Co., Ltd., Suwon (KR)

(*) Notice: Subject to any disclaimer, the term of this patent is extended or adjusted under 35 U.S.C. 154(b) by 1841 days.

(21) Appl. No.: 11/200,547

(22) Filed: Aug. 9, 2005

(65) Prior Publication Data

US 2006/0156307 A1    Jul. 13, 2006

Related U.S. Application Data

(60) Provisional application No. 60/643,097, filed on Jan. 7, 2005.

(51) Int. Cl.
| | |
|---|---|
| *G06F 9/46* | (2006.01) |
| *H04N 7/18* | (2006.01) |
| *G08B 5/22* | (2006.01) |
| *G08B 25/00* | (2006.01) |
| *G05B 11/01* | (2006.01) |
| *G08C 19/16* | (2006.01) |

(52) U.S. Cl.
USPC .............. 718/100; 718/103; 725/78; 725/80; 725/81; 340/8.1; 340/12.22

(58) Field of Classification Search
None
See application file for complete search history.

(56) References Cited

U.S. PATENT DOCUMENTS

| | | | |
|---|---|---|---|
| 5,410,326 | A | 4/1995 | Goldstein |
| 5,530,861 | A | 6/1996 | Diamant et al. |
| 5,544,321 | A | 8/1996 | Theimer et al. |
| 5,555,376 | A | 9/1996 | Theimer et al. |

(Continued)

FOREIGN PATENT DOCUMENTS

| | | |
|---|---|---|
| EP | 0626635 | 11/1994 |
| EP | 0801342 | 10/1997 |

(Continued)

OTHER PUBLICATIONS

Paolucci, M. et al., "Semantic Matching of Web Services Capabilities", In First Int. Semantic Web. Conf. 2002, pp. 333-347, http://citeseer.ist.psu.edu/paolucci02semantic.html, United States.

(Continued)

*Primary Examiner* — Emerson Puente
*Assistant Examiner* — Charles Swift
(74) *Attorney, Agent, or Firm* — Kenneth L. Sherman, Esq.; Michael Zarrabian, Esq.; Sherman & Zarrabian LLP (57) ABSTRACT

A method and system that facilitates prioritization of tasks available through the devices in a home network. The tasks are user level descriptions of the high-level actions a user and underlying devices can perform. By prioritizing tasks for a user, the present invention aims to minimize the effort required to compare and comprehend the usefulness and feasibility of tasks. In doing so, the number of tasks possible to a user can be reduced and the highest priority task for a given user and device can be used by the application software as the suggested 'most likely' task for the user.

38 Claims, 4 Drawing Sheets

(56) References Cited

U.S. PATENT DOCUMENTS

| | | | |
|---|---|---|---|
| 5,611,050 A | 3/1997 | Theimer et al. | |
| 5,812,865 A | 9/1998 | Theimer et al. | |
| 5,910,799 A | 6/1999 | Carpenter et al. | |
| 6,169,991 B1 | 1/2001 | Tsukahara | |
| 6,256,019 B1 | 7/2001 | Allport | |
| 6,389,288 B1 | 5/2002 | Kuwahara et al. | |
| 6,563,430 B1 * | 5/2003 | Kemink et al. | 340/8.1 |
| 6,792,323 B2 * | 9/2004 | Krzyzanowski et al. | 700/90 |
| 6,931,630 B1 | 8/2005 | Cotner et al. | |
| 6,954,737 B2 | 10/2005 | Kalantar et al. | |
| 6,957,075 B1 | 10/2005 | Iverson | |
| 7,024,256 B2 | 4/2006 | Krzyzanowski et al. | |
| 7,046,263 B1 | 5/2006 | Abbott et al. | |
| 7,064,675 B2 | 6/2006 | Zigmond et al. | |
| 7,076,255 B2 | 7/2006 | Parupudi et al. | |
| 7,170,422 B2 | 1/2007 | Nelson et al. | |
| 7,184,848 B2 | 2/2007 | Krzyzanowski et al. | |
| 7,206,559 B2 | 4/2007 | Meade, II | |
| 7,307,746 B2 | 12/2007 | Inoue | |
| 7,336,942 B2 | 2/2008 | Wang | |
| 7,346,663 B2 | 3/2008 | Abbott et al. | |
| 7,493,294 B2 | 2/2009 | Flinn et al. | |
| 7,522,549 B2 | 4/2009 | Karaoguz et al. | |
| 7,533,079 B2 | 5/2009 | Naito et al. | |
| 7,613,285 B2 | 11/2009 | Hay et al. | |
| 7,681,203 B2 | 3/2010 | Mandato et al. | |
| 7,707,267 B2 | 4/2010 | Lisitsa et al. | |
| 2001/0032132 A1 | 10/2001 | Moran | |
| 2002/0119788 A1 | 8/2002 | Parupudi et al. | |
| 2002/0138327 A1 | 9/2002 | Mello et al. | |
| 2003/0046401 A1 | 3/2003 | Abbott et al. | |
| 2003/0073412 A1 | 4/2003 | Meade, II | |
| 2003/0088534 A1 | 5/2003 | Kalantar et al. | |
| 2004/0068507 A1 | 4/2004 | Inoue | |
| 2004/0100505 A1 * | 5/2004 | Cazier | 345/811 |
| 2004/0163073 A1 | 8/2004 | Krzyzanowski et al. | |
| 2004/0176118 A1 * | 9/2004 | Strittmatter et al. | 455/500 |
| 2004/0187152 A1 | 9/2004 | Francis et al. | |
| 2004/0230636 A1 | 11/2004 | Masuoka et al. | |
| 2005/0035846 A1 | 2/2005 | Zigmond et al. | |
| 2005/0055472 A1 | 3/2005 | Krzyzanowski et al. | |
| 2005/0108354 A1 | 5/2005 | Lisitsa et al. | |
| 2005/0114493 A1 * | 5/2005 | Mandato et al. | 709/223 |
| 2005/0164725 A1 | 7/2005 | Naito et al. | |
| 2005/0232242 A1 | 10/2005 | Karaoguz et al. | |
| 2005/0233748 A1 * | 10/2005 | Robinson et al. | 455/440 |
| 2005/0246726 A1 | 11/2005 | Labrou et al. | |
| 2005/0267770 A1 | 12/2005 | Banavar et al. | |
| 2005/0283532 A1 | 12/2005 | Kim et al. | |
| 2005/0288035 A1 | 12/2005 | Wang | |
| 2006/0064693 A1 * | 3/2006 | Messer et al. | 718/100 |
| 2006/0064694 A1 * | 3/2006 | Messer et al. | 718/100 |
| 2006/0069602 A1 * | 3/2006 | Messer et al. | 705/9 |
| 2006/0147001 A1 | 7/2006 | Ha et al. | |
| 2006/0149905 A1 | 7/2006 | Park et al. | |
| 2006/0156252 A1 | 7/2006 | Sheshagiri et al. | |
| 2007/0233287 A1 | 10/2007 | Sheshagiri et al. | |
| 2007/0266384 A1 | 11/2007 | Labrou et al. | |

FOREIGN PATENT DOCUMENTS

| | | |
|---|---|---|
| EP | 1168124 | 1/2002 |
| EP | 1431875 | 6/2004 |
| EP | 1458140 A1 | 9/2004 |
| FR | 2852173 | 9/2004 |
| JP | 11-352446 | 12/1999 |
| JP | 2000-266551 | 9/2000 |
| JP | 2002-049556 | 2/2002 |
| JP | 2002-063033 | 2/2002 |
| JP | 2002-116971 | 4/2002 |
| JP | 2002-533802 | 10/2002 |
| JP | 2004-266453 | 9/2004 |
| KR | 10-2000-0033089 | 6/2000 |
| KR | 10-2001-0014271 | 2/2001 |
| KR | 2001-0041425 | 5/2001 |
| KR | 2002-0022049 | 3/2002 |
| KR | 10-2003-0021251 | 3/2003 |
| KR | 1020050046580 | 5/2005 |
| KR | 10-2006-0043333 | 5/2006 |
| KR | 10-2006-0051202 | 5/2006 |
| KR | 10-2006-0051104 | 6/2006 |
| KR | 1020060068518 | 6/2006 |
| KR | 10-2006-0092993 | 8/2006 |
| KR | 10-2006-0063326 | 9/2006 |
| WO | WO 00/28436 | 5/2000 |
| WO | 0038039 | 6/2000 |
| WO | 00/39964 A1 | 7/2000 |
| WO | WO 00/39964 A | 7/2000 |
| WO | WO 00/59230 | 10/2000 |
| WO | WO 01/69380 A2 | 9/2001 |
| WO | WO 2004/031937 | 4/2004 |
| WO | WO 2004/062227 | 7/2004 |
| WO | 2004081713 | 9/2004 |

OTHER PUBLICATIONS

Sycara, K. et al., "Larks: Dynamic Matchmaking among Heterogeneous Software Agents in Cyberspace", Autonomous Agents and Multi-Agent Systems, 2002, pp. 173-203, Kluwer Academic Publishers, http://www-2.cs.cmu.edu/~softagents/papers/Larks.pdf, United States.

Masuoka, R. et al., "Task Computing—Semantic-web enabled, user-driven, interactive environments", Fujitsu Laboratories of America, Inc., College Park, Maryland, pp. 1, http://www.flacp.fujitsulabs.com/, United States.

Gonzalez-Castillo, J. et al., "Description Logics for Matchmaking of Services", Hewlett-Packard Company, 2001, pp. 1-13, http://www.hpl.hp.com/techreports/2001/HPL-2001-265.pdf, Bristol, United Kingdom.

Avancha, S. et al., "Enhanced Service Discovery in Bluetooth", IEEE Computer, Jun. 28, 2002. pp. 96-99, vol. 35, University of Maryland, Baltimore County, United States.

Chakraborty, D. et al., "DReggie: Semantic Service Discovery for M-Commerce Applications", Workshop on Reliable and Secure Applications in Mobile Environment, in Conjunction with 20th Symposium on Reliable Distributed Systems (SRDS), Oct. 12, 2001, pp. 1-6, http://ebiquity.umbc.edu/paper/html/id/49/, United States.

Milojicic, D. et al., "Appliance Aggregation Architecture (A3)", HP Labs Technical report HPL-2002-277, Jul. 3, 2003, pp. 1-10, United States.

Hendler, J. et al., "Integrating Applications on the Semantic Web," Journal of the Institute of Electrical Engineers of Japan, Oct. 2002, pp. 676-680, vol. 122(10), United States.

Haarslev, V. et al., "Description of the RACER System and its Applications", in Proceedings of the International Workshop in Description Logics 2001 (DL2001), Aug. 2001, Stanford, pp. 701-705, http://citeseer.ist.psu.edu/article/haarslev01description.html, United States.

"OWL Web Ontology Language Reference", WC3 Semantic Web, Dec. 9, 2003, http://www.daml.org/2002/06/webont/owl-ref-proposed.html, United States.

Hill, E., "Jess, the Rule Engine for the Java Platform", Java Expert System Shell, http://herzberg.ca.sandia.gov/jess/, United States.

Connolly, D. et al., "DAML+OIL (Mar. 2001) Reference Description," W3C Note, Dec. 18, 2001, pp. 1-17, States.

Kopena, J.B. et al., "DAMLJessKB: A tool for reasoning with the Semantic Web". IEEE Intelligent Systems, 2003, pp. 74-77, vol. 18(3), United States.

"DAML+OIL Specification", Mar. 2001, pp. 1-13, http://www.daml.org/2001/03/daml+oil, United States.

Berners-Lee, T. et al., "The Semantic Web: A new form of Web content that is meaningful to computers will unleash a revolution of new possibilities", Scientific American.com, May 17, 2001, pp. 1-5, http://www.sciam.com, United States.

Berners-Lee, T. et al., WC3 Semantic Web, Technology and Society Domain, "Semantic Web", pp. 1-5, http://www.w3.org/2001/sw/, United States.

European Search Report and Search Opinion; Application No. 06250036.8-1525; dated Sep. 17, 2007.

U.S. Final Office Action for U.S. Appl. No. 11/200,546 mailed Jan. 5, 2010.
U.S. Final Office Action for U.S. Appl. No. 11/394,968 mailed Feb. 12, 2009.
U.S. Office Action for U.S. Appl. No. 11/394,968 mailed Aug. 25, 2008.
U.S. Non-final Office Action for U.S. Appl. No. 10/948,399 mailed Mar. 17, 2009.
U.S. Final Office Action for U.S. Appl. No. 10/948,399 mailed Oct. 27, 2009.
U.S. Non-final Office Action for U.S. Appl. No. 10/947,774 mailed Dec. 15, 2008.
U.S. Final Office Action for U.S. Appl. No. 10/947,774 mailed Aug. 31, 2009.
U.S. Non-final Office Action for U.S. Appl. No. 10/950,121 mailed Dec. 19, 2008.
U.S. Final Office Action for U.S. Appl. No. 10/950,121 mailed Sep. 2, 2009.
U.S. Advisory Action for U.S. Appl. No. 11/200,546 mailed Jan. 22, 2009.
U.S. Final Office Action for U.S. Appl. No. 11/200,546 mailed Oct. 15, 2008.
U.S. Non-final Office Action for U.S. Appl. No. 11/200,546 mailed Apr. 25, 2008.
R. Kumar, V. Poladian, I. Greenberg, A. Messer, and D. Milojicic, *User-Centric Appliance Aggregation*, HP Labs: Tech Report: HPL-2002-227, Oct. 2, 2002.
Office Action dated Jun. 16, 2009 in U.S. Appl. No. 11/200,546.
Lashina et al., "The context aware personal remote control: a case study on context awareness", published 2003.
Chinese Third Office Action dated Aug. 4, 2010 issued for Chinese Patent Application No. 200510132458.3, filed Aug. 5, 2009, pp. 1-12, Beijing, China (English-language translation included).
Office Action is corresponding Japanese Application No. 2006-001541, mailed Jan. 4, 2011.
Office Action (and English translation) in corresponding Korean Application No. 10-2005-0112970, mailed Nov. 10, 2006.
Decision of Grant in in corresponding Korean Application No. 10-2005-0112970, mailed Jul. 16, 2007.
Huh et al., "A Policy-based Context Management Architecture for Ubiquitous Computing Environment," Nov. 3, 2004.
Notice of Allowance in U.S. Appl. No. 11/200,546, mailed Mar. 8, 2011.
Notice of Allowance in U.S. Appl. No. 10/950,121, mailed Apr. 20, 2011.
Notice of Allowance in U.S. Appl. No. 10/947,774, mailed Apr. 11, 2011.
Notice of Allowance in U.S. Appl. No. 10/948,399, mailed Jun. 3, 2011.
Office Action in corresponding Japanese Application No. 2005-274134, mailed Feb. 1, 2011.
Notice of Allowance dated Sep. 29, 2011 from U.S. Appl. No. 10/948,399.
Notice of Allowance dated Oct. 18, 2011 from U.S. Appl. No. 10/947,774.
Almeida et al., "Abstract Interactions and Interaction Refinement in Model-Driven Design," Proceedings of the 2005 Ninth IEEE International EDOC Enterprise Computing Conference, Sep. 19-23, 2005, 14 pages.
Office Action in Japanese Application No. 2005-274135, mailed Feb. 1, 2011.
Office Action dated Sep. 28, 2007 from Chinese Application No. 2005101049529.
Office Action dated Jun. 15, 2007 from Chinese Application No. 200510104950X.
Office Action dated Oct. 26, 2006 from Korean Application No. 10-2005-0084649.
Decision to Grant dated May 29, 2007 from Korean Application No. 10-2005-0084649.
Lee et al, "Coupling structural and functional models for interaction design," Interacting With Computers, Butterworth-Heinemann, GB, vol. 16, No. 1, Feb. 2004, pp. 133-161, XP004908657 ISSN: 0953-5438.
Office Action dated Oct. 26, 2006 from Korean Application No. 10-2005-0083589.
Decision to Grant dated May 29, 2007 from Korean Application No. 10-2005-0083589.
Office Action in Japanese Application No. 2006-001541, mailed Aug. 23, 2011.
Notice of Allowance dated Jan. 27, 2012 from U.S. Appl. No. 10/950,121.
Notice of Allowance dated Feb. 23, 2012 from U.S. Appl. No. 10/947,774.
Chinese Office Action dated Jun. 2, 2011 from Chinese Application No. 200510132458.3.
Chinese Office Action dated Nov. 2, 2011 from Chinese Application No. 200510132458.3.
Notification of Granting of Patent Right Invention from Chinese Application No. 200510104949.7.
European Search Report from EP05255590 mailed Mar. 1, 2012.
Search Opinion from EP Publication No. 1679828, dated Apr. 6, 2006.
Search Report from EP Publication No. 1679828, dated Apr. 6, 2006.
Search Report from EP Publication No. 1640838, dated Nov. 16, 2005.
Exam Report from EP Publication No. 1640838, dated May 5, 2006.
Search Report from EP Publication No. 1640839, dated Nov. 24, 2005.
Exam Report from EP Publication No. 1640839, dated May 5, 2006.
Notice of Allowance dated Aug. 1, 2011 from U.S. Appl. No. 11/200,546.
Office Action for Chinese Application 200610000398.4, dated Dec. 21, 2007.
Notice of Allowance dated Aug. 5, 2011 from U.S. Appl. No. 10/950,121.
Office Action dated Jan. 8, 2010 from Chinese Application No. 2005101049497.
Reexamination dated Oct. 9, 2010 from Chinese Application No. 2005101049497.
Office Action dated Aug. 15, 2008 from Chinese Application No. 2005101049497.
Office Action dated Dec. 28, 2007 from Chinese Application No. 2005101049497.
Office Action dated Jun. 15, 2007 from Chinese Application No. 2005101049497.
Notice of Allowance dated Apr. 27, 2007 from Korean Application No. 9-5-2007-023065177.
Office Action dated Nov. 7, 2006 from Korean Application No. 9-5-2006-065657876.
Office Action dated Nov. 21, 2008 from Chinese Application No. 2005101324583.
Office Action dated May 22, 2009 from Chinese Application No. 2005101324583.
Office Action dated Oct. 20, 2006 from European Application No. 05257951.3.
Search Report dated Apr. 13, 2006 from European Application No. 05257951.3.
Office Action dated Nov. 22, 2006 from Korean Application No. 9-5-2006-069705515.
Notice of Allowance dated Apr. 27, 2007 from Korean Application No. 9-5-2007-023304342.
U.S. Notice of Allowance mailed Nov. 16, 2012 for U.S. Appl. No. 10/950,121.

* cited by examiner

METHOD AND SYSTEM FOR PRIORITIZING TASKS MADE AVAILABLE BY DEVICES IN A NETWORK

RELATED APPLICATION

Priority is claimed from U.S. provisional application Ser. No. 60/643,097, filed on Jan. 7, 2005, incorporated herein by reference.

FIELD OF THE INVENTION

The present invention relates in general to presenting tasks in a network, and in particular to prioritizing tasks made available by devices in a network such as a home network.

BACKGROUND OF THE INVENTION

In a home network environment where multiple networked consumer electronic devices are available, the number of tasks available for the user to execute can be potentially large. Among the available tasks some tasks may be totally irrelevant to the user due to their current context and some may be less relevant compared to the rest and thus less likely to be executed by the user. This may occur for many reasons: (1) the task may use devices that do not involve a device that the user is currently using and therefore is unlikely to be chosen by the user: (2) the task may use several devices that are based in other rooms, combining the current device with a display device in another room is an unlikely combination because the user is unlikely to be able to see the output of the request.

Conventionally, a system discovers devices and thereby the services available in an ad-hoc environment. That system further identifies the services that can be aggregated and finally suggests the possible service combinations to the user. While suggesting the aggregated service combinations to the user, the system scores the services based on any user preferences set and execution history for the user and displays the service with the highest score to the user. However, in such a system, the services are ranked based on user preferences and execution history without considering the context of the user and, hence, results in scoring the services in a way that does not reflect the user intentions at that particular instant.

BRIEF SUMMARY OF THE INVENTION

The present invention addresses the above shortcomings. In one embodiment the present invention provides a method and system that facilitates prioritization of tasks available through the devices in a home network. The tasks comprise user level descriptions of the high-level actions a user can perform using the underlying devices. By prioritizing tasks for a user, the present invention aims to minimize the effort required to compare and comprehend the usefulness and feasibility of tasks. In doing so, the number of tasks shown to a user as being possible, can be reduced and the task identified as the highest priority task for a given user can be used by the application software as the suggested 'most likely' task for the user. Further, tasks identified as having a lower priority can be interpreted by the application as tasks that are less likely to be chosen by the user. For example, a task that involves devices in different rooms is possible, but in all probability, it will not be chosen by the user.

To provide accurate prioritization, the present invention allows prioritization of tasks for a particular user based on the context of the user and in general based on factors such as the devices needed for the tasks, the devices in the system, and the attributes of the devices in the system, etc., thereby, identifying tasks that would most likely be preferred and executed by the user.

These and other features, aspects and advantages of the present invention will become understood with reference to the following description, appended claims and accompanying figures.

DETAILED DESCRIPTION OF THE INVENTION

In one embodiment the present invention provides a method and system that facilitates prioritization of tasks available through the devices in a home network. The tasks comprise user level descriptions of the high-level actions a user can perform using the underlying devices. By prioritizing tasks for a user, the present invention aims to minimize the effort required to compare and comprehend the usefulness and feasibility of tasks. In doing so, the number of tasks shown to a user as being possible, can be reduced and the task identified as the highest priority task for a given user can be used by the application software as the suggested 'most likely' task for the user. Further, tasks identified as having a lower priority can be interpreted by the application as tasks that are less likely to be chosen by the user. For example, a task that involves devices in different rooms is possible, but in all probability, it will not be chosen by the user.

To provide accurate prioritization, the present invention allows prioritization of tasks for a particular user based on the context of the user and in general based on factors such as the devices needed for the tasks, the devices in the system, and the attributes of the devices in the system, etc., thereby, identifying tasks that would most likely be preferred and executed by the user.

In one implementation, the present invention provides a controller that infers the degree of relevance of a task to a user, based on various factors such as e.g.: (1) the context of the user including the location of the user, (2) the device used by the user to browse/select tasks, (3) the location of devices used for each tasks, (4) the quality and the capability of the devices that are needed to execute the task, etc. The controller assigns a score for each task based on the inferred degree of relevance, prioritizes the tasks based on the scores and makes this list of tasks available to a client user interface (UI) application to utilize.

The client application may use the task list in a variety of ways, including e.g.: (1) presenting the task list to the user by order of task score with the ones identified as being the most relevant on the top of the list and the less relevant ones beneath, (2) presenting the top few tasks to the user, (3) using the list to pick the top matching task according to an initial request from the user (e.g., user selected 'Play' and 'Bedroom', wherein the top matching item may be 'Play DVD in the Bedroom in Widescreen'), and (4) using the top item of the list as a recommendation or default choice of the most likely task for the user.

Figure 1:
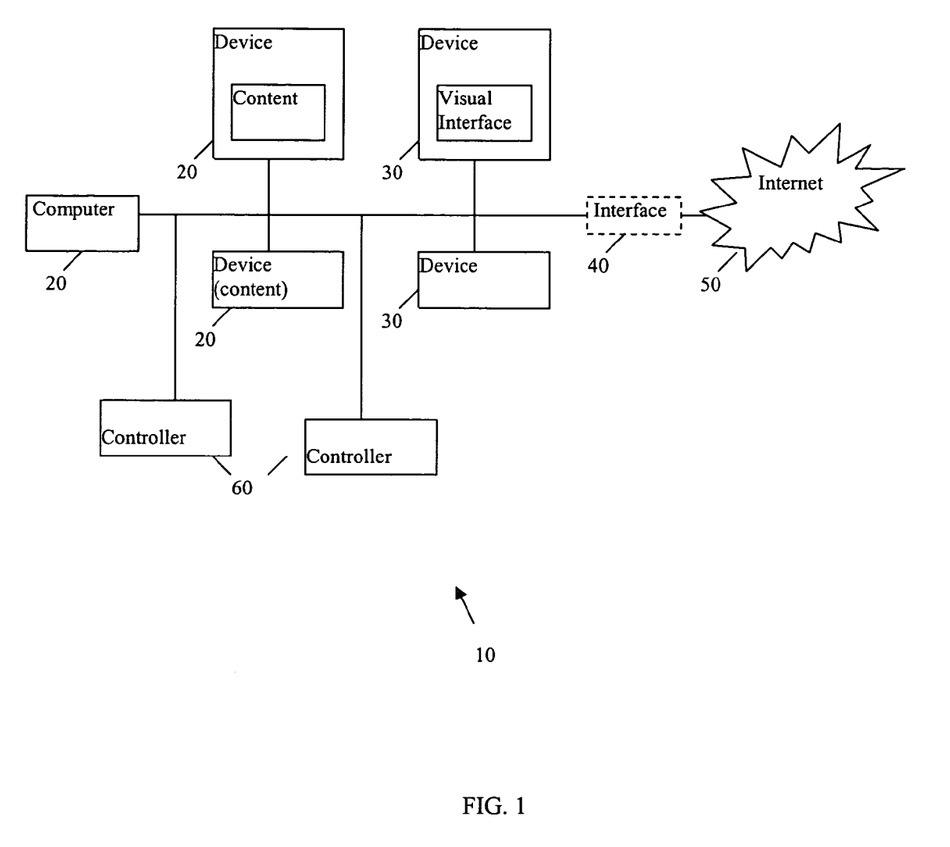
FIG. 1 shows an example of a network implementing an embodiment of prioritizing tasks according to the present invention.

FIG. 1 shows an example functional architecture of a network 10, such as a home network, that implements a method for facilitating prioritization of tasks available through the devices in the home network, according to an embodiment of the present invention. The network 10 comprises devices 20 (e.g., including content) and devices 30 (e.g., client device having a visual interface to display a GUI), and optional interface 40 that connects the network 10 to another network 50 (e.g., another home network, the Internet, etc.). Though the devices 20 and 30 are shown separate, a single physical device can include one or more client devices and/or one or more server devices.

The devices 20 and 30, respectively, can implement the HTTP protocol for communication and protocol therebetween. Though in the example described herein the HTTP protocol is utilized by the network 10, those skilled in the art will recognize that the present invention is useful with other network communication protocols that utilize the client-server model. An example device 20 can be a VCR, DVD, computer, etc. Further, an example client device 30 can be a TV, computer, etc.

Figure 2:
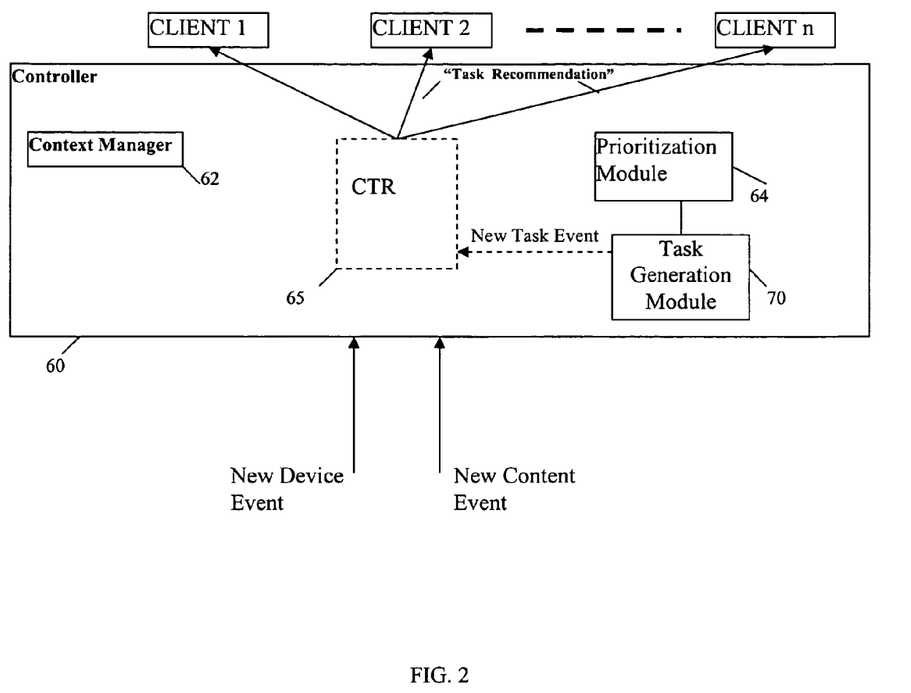
FIG. 2 shows a functional block diagram of an embodiment of a controller for prioritizing tasks according to the present invention.

The network 10 further includes at least one Controller 60 that, as discussed, infers the degree of relevance of a task to a user, based on various factors. FIG. 2 shows a function block diagram of the Controller 60 which interacts with client programs (e.g., CLIENT 1, CLIENT 2 . . . CLIENT N) in a network.

The Controller 60 includes a Context Manager module 62 that gathers user context information such as the location and the device used by the user. In this example, location of each device is provided by e.g. the device itself (set at install time), by a configuration file (for devices that cannot provide their location), etc. The devices/configuration files that run the user's client program also contain an additional piece of information called a "cookie". When the user starts the client program, the client program transmits a cookie to the Controller 60. The Controller 60 matches the cookie provided by the client program with the cookie in the device configuration files. The location of the device whose cookie matches the client cookie is identified as the location of the user.

Finally, content meta-data contains the location of the content. Content meta-data comprises information about the content. For example, a music file contains the track name, the artist, the album, the track number, MIME-type etc. According to an embodiment of the present invention, additional meta-data is provided in the system. For example, the location information is added to the content meta-data. This piece of data allows correlating location of the content with the location of the user.

The location for the content is determined from the location of the device that generates or stores the content. The location information can also be obtained from sensors such as GPS on the device. Though some consumer electronics (CE) in a home network may not be equipped with location sensors, use of such location sensors are contemplated by the present invention.

Once the devices in the home network are discovered, the Task Generation module 70 gathers the task and device descriptions from the devices and determines the tasks achievable in the home network based on these descriptions The Task Generation module 70 obtains: (1) device function descriptions, wherein each device function description describes a function that a device can perform, and (2) task descriptions, wherein each task description describes the device functionality a certain task requires. The Task Generation module 70 then generates combinations of tasks, wherein a task comprises a user level description of the high-level actions a user can perform using the devices. In one example the user level description comprises a task suggestion based on the obtained task descriptions and device function descriptions (i.e., each task suggestion represents a user task based on one or more of the obtained device function descriptions and task descriptions). The combinations of tasks generated by the Orchestrator module are called task combinations (TC) and the set of devices needed to execute a task combination are referred to as device combinations.

The Controller 60 further includes a Prioritization Module 64. According to the Prioritization Module 64, the task combinations are then scored based on the features supported by the device, and a set of policies to score the combinations based on the device and user's context. The result of this ranking is a set of scores formulated from groups or levels of scores. Each score level represents a level of contextual importance. Within that score level, the items are ranked on secondary factors such as device scores. As such, the best devices appear first for the level of contextual match (i.e., those matching fully the policy for that level may be ranked higher than others that match only part of the policy of that level). Doing so, allows a range of scores using simple integers to be computed while allowing new devices to enter and leave the home network without causing scores of other combinations to change.

The factors affecting such prioritization are user, as well as task/device, dependent. Therefore, high priority tasks for one user may be different between different home networks, because the home networks may contain different devices. In addition, the same user in one room for a home network may have different tasks based on history, preferences or security/access limitations. Further, history or learning-based prioritization can be added orthogonally in the scoring and categorization.

In addition to the user location information the Prioritization Module 64 determines the capability information of the devices using the device descriptions provided by the device manufacturer, providing information about various device attributes and how they compare against other attributes. Device descriptions provide the functionalities of the devices, for example, whether a device is a media store, whether it is an output device (renderer), etc. In addition, device descriptions include attribute information such as screen size and an indication of the type of relation between attribute values and the magnitude of the difference between the attribute values (comparison scale for that particular attribute type). For example, screen size is measured in inches. Two inches is twice as much as one inch, whereas sound is measured in decibels where 2 dB is 100 more than 1 dB.

In one example operation, device attributes are categorized into two types by a ranking scheme in the Task Generation module 70, comprising: Numeric attributes (NA) and Non-numeric attributes (NNA). For example, a NA value such as screen size is processed using a 'greater than' relationship: A 60" is better than a 30" TV simply by the magnitude of the NA (i.e., 60" is 'greater than' 30").

Further, NNA values are scored by their relative score between themselves and other NNA values for the same attribute. For instance, 'betterThan' and 'sameAs' relations are used to compare two NNAs. The NNA description also includes a 'relativeScore' property which indicates the "degree of betterness" (i.e., 'betterness'). From this 'relativeScore' and 'betterness', a scale can be computed on the NNA values. Other types of scoring can be also be used.

Using this attribute information, a table is generated where each attribute has a score associated with it. To ensure that the scale is constant, it is cached such that only when new devices or technologies enter the home network does the table need to be recomputed. Further, the table is recomputed only if the new device/technology affects the upper or lower bound of the scale. The score of each device is computed by adding the scores of attributes that are supported by the device.

Figure 3:
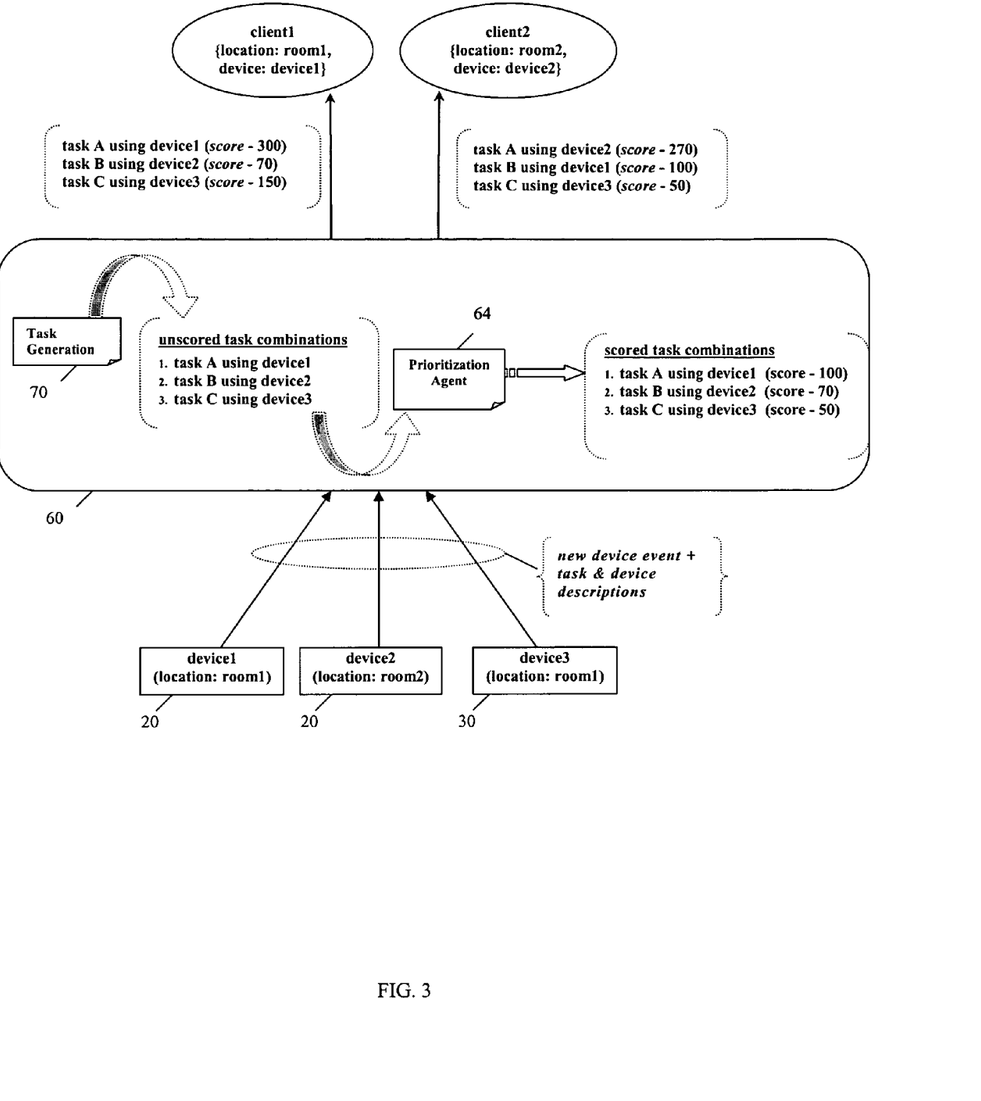
FIG. 3 shows a functional block diagram of an embodiment of a controller for prioritizing tasks according to the present invention.

Referring to the functional block diagram in FIG. 3, in one example operation of the network 10, information including new device events, task descriptions and device descriptions are provided to the controller 60 by devices 20, 30 (e.g., device1, device2, device3, etc.) in the network. The Task Generation module 70 uses the new device events, task descriptions and device descriptions to provide unscored task combinations (e.g., task A using device1, task B using device2, task C using device3, etc.), and scores for individual devices that make-up the task (e.g., device1 (score 100), device2 (score 7), etc.), to the Prioritization module 64. The Prioritization module scores the task combinations, using the individual device scores, to generate scored task combinations (e.g., task A using device1 (score 100), task B using device2 (score 7), task C using device 1 and device 2 (score 107), etc.). The scored task descriptions are then provided to client applications (e.g., client1 on device1, client2 on device2, etc.), but scoring adjusted for each client program based on context (e.g., user context, device context, etc.) for user selection/interaction. The task scoring going into client1 and client 2, changed from the scoring by the Prioritization module 64 due to second level of prioritization; the first level of prioritization is performed based on the capability and quality of devices required for the task, and the second level of prioritization is performed based on the user's context (e.g., user's location and the device used to browse the tasks available in the home).

In one implementation of the Controller 60, the example steps in the flowchart of FIG. 4 described below are used in the Prioritization module 64 to score task combinations generated by the Task Generation module 70. The example scoring is based on normal human interaction semantics in using home electronics in a network.

Figure 4:
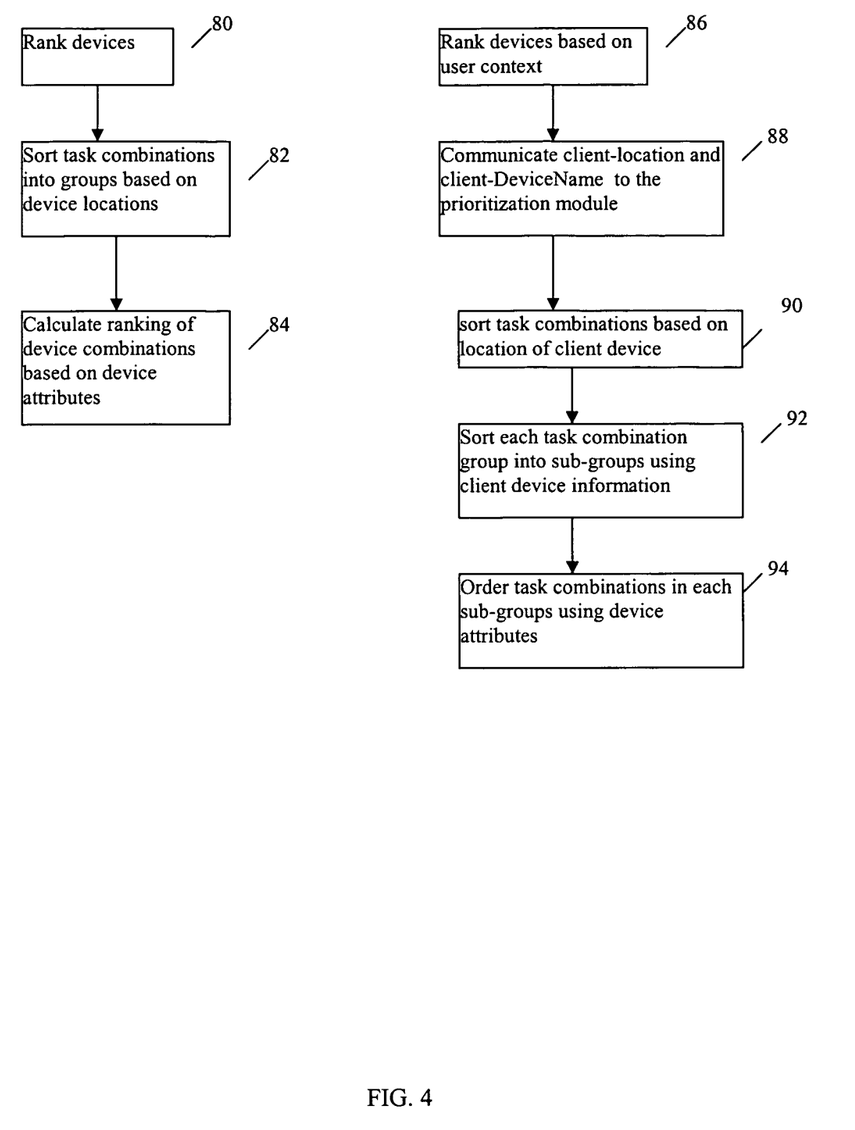
FIG. 4 shows a flowchart of the steps for an embodiment of a method of prioritizing tasks according to the present invention.

Referring to the flowchart in FIG. 4 in conjunction with FIG. 3:
  1: In step 80 performing general ranking of devices based on context, independent of the user, and further including:
    1.1: In step 82 sorting task combinations (TC) based on device locations, wherein TCs with devices that are located in the same room in the home network are ranked the highest, forming a first group (TC-Group1). This first group is followed by a second group (TC-Group2) which includes TCs with devices from the same room and mobile devices. A third group (TC-Group3) includes TCs with devices that are not in the same room but share the same floor (some of these devices can be mobile). A fourth group (TC-Group4) includes TCs with devices that have single unknown location, and a fifth group (TC-Group5) includes TCs with devices that have multiple unknown locations. As such:
      TC-Group1: Devices in the same room
      TC-Group2: Devices with same room and mobile devices
      TC-Group3: Devices in the same floor but different rooms
      TC-Group4: Single device with unknown location
      TC-Group5: Multiple devices with unknown location, and devices with known locations but different floors
    1.2: In step 84 calculating ranking of device combinations based on device attributes, wherein each TC in the TC list (TCL) is now assigned a device combination score using a ranking scheme explained above.
  2: In step 86 ranking of the device based on user context, wherein after the client program is started, the client-location and client-DeviceName is passed on to the Prioritization module 64 (step 88), and further including:
    2.1: In step 90 sorting TCs based on location of the client device, wherein the TCs in Group 1 (TC-Group1) are further ordered. TCs which have the same room as the room in which the client device is located, are moved to the top of the current task combination list. If the client device is a mobile device then this step is skipped. Mobile devices often have the location 'Unknown' because their location cannot be determined without location sensors.
    2.2: In step 92 Sorting each of said five groups using the client device information, wherein in each of the above five groups, TCs with one or more occurrence of client device are grouped together and pushed to the top. This step creates at most two sub-groups per group. The client device, apart from showing the GUI to the user can also participate in a task. As such, when the user uses a particular device to interact with the system, it is quite likely that the user wants to use the same device to e.g. play movie or play music. Therefore, tasks that involve the client device are pushed up in the prioritized list.
    2.3: In step 94 Ordering TCs that belong to a single sub-group using device attributes, wherein after the sorting step above, there are at most five groups and ten sub-groups. Each of these groups can include 0 or more TCs. To sort the TCs within a sub-group, device attributes are utilized. The task combination ranking scheme assigns a unique score to each task combination.

The result of the above steps is a set of scores, grouped into categories (e.g., scores from 100-200 are for task combinations with all devices in the same room, scores from 200-300 are for combinations with renderers in the same room, etc.). Over this scoring, the user context is applied so that combinations that most match the user's context (e.g., location) and the context of the devices are higher than others (e.g., in distance rooms).

Referring back to FIG. 2, the Controller 60 includes a Task Generation module 70 and a Contextual Task Recommender (CTR) 65 that provides task recommendations to clients. The controller 60 may make use of the prioritized list of tasks by context to change its operation accordingly, such as suggesting tasks using the optional CTR 65 based on correlated changes. The CTR 65 suggests tasks in accordance with certain policies. For example, the user can control the behavior of the system by changing the rules in the policy. The Contextual Task Recommender 65 is triggered via a New Device Event or a New Content Event whenever a new device or new content, respectively, is discovered in the network. Typical user activities that can trigger the CTR 65 include e.g. turning a TV 'ON', inserting an Audio CD into a device, etc. The determination of context and the recommendation of tasks are performed by keeping track of the content and the devices available to the user at any given time.

Although the primary embodiment implemented for the prioritization approach described herein is for a home network environment, those skilled in the art will recognize that the present invention can be applied to other types of environment such as e.g. an office space, airport, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of prioritizing tasks in a network of devices, comprising:
    obtaining task combinations, wherein each task combination identifies a set of devices that can perform tasks for a specific task combination together; and
    employing a processor for:
        generating a proximity ranking for each task combination based on proximity between devices of said task combination;
        determining a degree of user relevance for each specific task combination based on user context and device context;
        determining a device score for each device based on attributes of said device;
        prioritizing the task combinations based on at least one proximity ranking, at least one degree of user relevance, and at least one device score; and
        presenting the prioritized task combinations as suggestions via a client user interface.

2. The method of claim 1, wherein prioritizing the task combinations includes prioritizing the task combinations based on user context.

3. The method of claim 2, wherein prioritizing the task combinations includes prioritizing the task combinations based on context of the devices needed for performing the task combinations.

4. The method of claim 1, wherein prioritizing the task combinations includes prioritizing the task combinations based on attributes of the devices in the network.

5. The method of claim 1, wherein prioritizing the task combinations includes prioritizing the task combinations based on context of a client user interface including a location of the client user interface.

6. The method of claim 1, wherein prioritizing the task combinations includes prioritizing the task combinations based on a user device for browsing and/or selecting task combinations.

7. The method of claim 1, wherein prioritizing the task combinations includes prioritizing the task combinations based on a location and/or type of devices used for performing task combinations.

8. The method of claim 1, wherein prioritizing the task combinations includes prioritizing the task combinations based on attributes of the devices that are needed to execute the task combinations.

9. The method of claim 1, wherein prioritizing the task combinations includes assigning a score for each task combination based on an inferred degree of user relevance.

10. The method of claim 1, wherein prioritizing the task combinations includes assigning a score for each task combination based on an inferred degree of user relevance, and presenting the device combinations to a client user interface based on the scores, as available tasks.

11. The method of claim 1, wherein each task combination represents a set of user tasks based on one or more device function descriptions and task descriptions.

12. The method of claim 11 wherein obtaining device combinations further includes:
    obtaining device function descriptions, wherein each device function description describes a function that a device can perform;
    obtaining task descriptions, wherein each task description describes the device functionality a certain task requires; and
    generating task combinations based on the obtained task descriptions and device function descriptions.

13. The method of claim 1, further comprising:
    discovering the devices in the network; and
    obtaining device function descriptions that describe functions that a device can perform.

14. The method of claim 1, wherein device location is provided by each device.

15. The method of claim 1, wherein prioritizing the task combinations includes prioritizing the task combinations based on location of content in the network, and the location information is provided by each content in the network.

16. The method of claim 15, further comprising:
    correlating location of content with user location, wherein prioritizing the task combinations is based on correlations of content location and user location.

17. The method of claim 1, wherein the proximity rankings of task combinations are based on the proximity of the set of devices with respect to a client device.

18. The method of claim 1, wherein the proximity rankings of task combinations including ranking a plurality of devices in a same room location higher than task combinations including devices in different room locations.

19. The method of claim 1, wherein prioritization of task combinations are user dependent.

20. The method of claim 19, wherein prioritization of task combinations are based on user device access limitations.

21. The method of claim 1, wherein the proximity ranks of task combination include ranking a set of devices that is in the same room as the client device higher than other task combinations having at least some devices located in different room locations.

22. A controller for prioritizing tasks in a network of devices extending over a plurality of rooms on at least one floor of a building, comprising:
    a processor coupled with:
        a task generation module configured to generate task combinations, wherein each task combination identifies a set of devices that can perform tasks for a specific task combination together; and
        a prioritizing module configured to:
            generate a proximity ranking for each task combination based on proximity between devices of said task combination;
            determine a degree of user relevance for each specific task combination based on user context and device context;
            determine a device score for each device based on attributes of said device; and
            prioritize the task combinations based on at least one proximity ranking, at least one degree of user relevance, and at least one device score.

23. The controller of claim 22, wherein the prioritizing module prioritizes the task combinations based on user context.

24. The controller of claim 22, wherein the prioritizing module prioritizes the task combinations based on context of the devices needed for performing the task combinations.

25. The controller of claim 22, wherein the prioritizing module prioritizes the task combinations based on attributes of the devices in the network.

26. The controller of claim 25, wherein the prioritizing module prioritizes the task combinations based on context of a client user interface including a location of the client user interface.

27. The controller of claim 22, wherein the prioritizing module prioritizes the task combinations based on a user device for browsing and/or selecting task combinations.

28. The controller of claim 22, wherein the prioritizing module prioritizes the task combinations based on a location and/or type of devices used for performing task combination.

29. The controller of claim 22, wherein the prioritizing module prioritizes the task combinations based on attributes of the devices that are needed to execute the task combinations.

30. The controller of claim 22, wherein the prioritizing module prioritizes the task combinations based on an inferred degree of user relevance.

31. The controller of claim 22, wherein the prioritizing module prioritizes the task combinations based on an inferred degree of user relevance, and presenting the device combinations to a client user interface based on the scores, as available tasks.

32. The controller of claim 22, wherein each task combination represents a set of user tasks based on one or more device function descriptions and task descriptions.

33. The controller of claim 32 wherein the task generation obtains device combinations by:
obtaining device function descriptions, wherein each device function description describes a function that a device can perform;
obtaining task descriptions, wherein each task description describes the device functionality a certain task requires; and
generating task combinations based on the obtained task descriptions and device function descriptions.

34. The controller of claim 22 further comprising an application module for presenting the prioritized task combinations to a client user interface.

35. The controller of claim 22, wherein the proximity ranking of task combinations are based on the proximity of the set of devices with respect to a client device.

36. The controller of claim 22, wherein the proximity ranking of task combination includes ranking a set of devices that is in the same room as the client device higher than other task combinations having at least some devices located in different room locations.

37. A network extending over a plurality of rooms on at least one floor of a building, comprising:
a plurality of devices interconnected via a communication link;
a controller for prioritizing tasks in the network, the controller comprising:
a task generation module configured to generate task combinations, wherein each task combination identifies a set of devices that can perform tasks for a specific task combination together; and
a prioritizing module configured to:
generate a proximity ranking for each task combination based on proximity between devices of said task combination;
determine a degree of user relevance for each specific task combination based on user context and device context;
determine a device score for each device based on attributes of said device; and
prioritize the task combinations based on at least one proximity ranking, at least one degree of user relevance, and at least one device score.

38. The network of claim 37, wherein the proximity ranking of task combinations are based on the proximity of the set of devices with respect to a client device.

* * * * *